United States Patent [19]

Sado et al.

[11] 4,289,940

[45] Sep. 15, 1981

[54] KEYBOARD SWITCH COVERING PADS

[75] Inventors: Ryoichi Sado, Saitama; Yoshitusgu Morikawa, Tokyo, both of Japan

[73] Assignee: Shin-Etsu Polymer Company, Ltd., Tokyo, Japan

[21] Appl. No.: 96,513

[22] Filed: Nov. 21, 1979

[30] Foreign Application Priority Data

Nov. 24, 1978 [JP] Japan .......................... 53-161710[U]

[51] Int. Cl.$^3$ .......................... H01H 9/26; B32B 3/10

[52] U.S. Cl. .................................... 200/5 A; 428/138; 428/189; 428/343; 428/492; 428/901

[58] Field of Search ............... 428/137, 446, 492, 901, 428/189, 138, 343; 235/145 R; 427/96, 58; 200/5 A

[56] References Cited

U.S. PATENT DOCUMENTS 3,860,771 1/1975 Lynn .............................. 235/145 R
4,042,439 8/1977 Pounds .............................. 235/145 R
4,090,045 5/1978 Marsh .............................. 200/5 A
4,163,138 7/1979 Harden .............................. 200/5 A

*Primary Examiner*—Paul J. Thibodeau
*Attorney, Agent, or Firm*—Hopgood, Calimafde, Kalil, Blaustein & Judlowe

[57] ABSTRACT

A novel keyboard switch covering pad suitable for use in, for example, a pocketable electronic calculator is proposed which is safe from the danger of failure or erroneous operation of the LSI or other electronic devices built in the instrument when two or more of the key switches are pushed simultaneously.

The keyboard switch covering pad of the invention comprises an electrically conductive rubber sheet divided into a desired number of sections and an electrically insulating sheet which serves as a common lining for the divided sections of the rubber sheet, on which the divided sections are bonded keeping an electrically insulating air gap space between each other.

2 Claims, 9 Drawing Figures

KEYBOARD SWITCH COVERING PADS

BACKGROUND OF THE INVENTION

The present invention relates to a keyboard switch covering pad made of an electrically conductive rubber sheet or, more particularly, to a keyboard switch covering pad used in an electronic instrument in which a common circuit is formed between the conductive rubber sheet of the pad and the printed circuit on which the keyboard switch covering pad is mounted.

Several of recent electronic instruments having one or more of so-called LSIs built therein, such as pocketable electronic calculators, are provided with a keyboard switch which is an assembly of the key switches for the numerical figures, e.g. 1,2,3, . . . , 9 and 0, and for the mathematical operators, e.g. +, ÷, ×, −, √ and the like. Such a keyboard switch is sometimes formed with a covering pad made of an electroconductive rubber sheet having a plurality of fixed contact points and switching contact points so as that a common circuit can be formed between the individual key switches and the printed circuit on which the keyboard switch is mounted.

One of the problems in the above described keyboard switches is that the LSI to be operated by pushing the key switches is liable to failure or erroneous operation when two or more of the key switches are pushed simultaneously. This problem can of course be overcome when the conductive rubber sheet for the covering pad is divided into several sections, which are mounted on the printed circuit separately as insulated from each other. In other words, the keyboard switch comprises two or more of smaller independent covering pads instead of a single integrated covering pad.

The problem in handling such divided covering pads is the increased labor cost in mounting the keyboard switch on a printed circuit with accuracy in comparison with a single integrated covering pad. Therefore, it is a usual practice that the divided covering pad sections are bonded together in advance by use of an insulating adhesive agent, optionally, with insulating rubber spacers intervening therebetween into a single integrated covering pad before they are mounted on the printed circuit.

The use of an adhesive agent is, however undesirable because there may be a trouble that the function of the keyboard switch is sometimes impaired by the adhesive agent sticking on improper portions of the surface of the covering pad such as the contacting surfaces of the fixed contact points and switching contact points. Further, the use of insulating rubber spacers may cause a distortion in the bonded areas or obstruction of the switching function of the finished keyboard switch covering pad when the integrated covering pad is assembled with unsatisfactory accuracy.

SUMMARY OF THE INVENTION

It is therefore an object of the present invention to provide a novel and improved keyboard switch covering pad having a plurality of fixed contact points and switching contact points so as that a common circuit is formed between the key switches of the keyboard switch covering pad and the printed circuit on which the keyboard switch covering pad is mounted.

The keyboard switch covering pad of the invention comprises (a) an electrically conductive rubber sheet having a plurality of fixed contact points and a plurality of switching contact points on one side thereof, said conductive rubber sheet being divided into at least two sections each having at least one fixed contact point and at least one switching contact point, and (b) an electrically insulating sheet having a plurality of openings, on which the conductive rubber sheet as divided into sections is adhesively bonded in such a manner that each of the fixed contact points and the switching contact points penetrates one of the openings and the divided sections of the conductive rubber sheet are electrically insulated from each other.

BRIEF DESCRIPTION OF THE DRAWING

FIG. 8 is being prepared.

DETAILED DESCRIPTION OF THE PREFERRED EMBODIMENTS

The keyboard switch covering pad of the invention is now illustrated in detail with reference to the drawings annexed.

Figure 1:
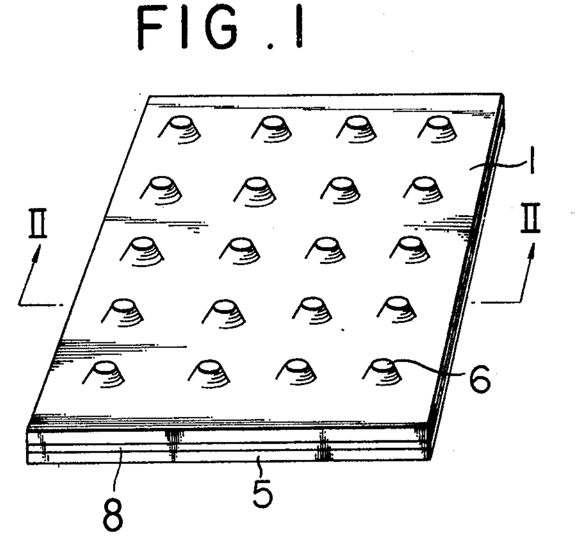
FIG. 1 is a perspective view of a conventional Keyboard switch covering pad as mounted on a printed circuit board.
Figure 2:
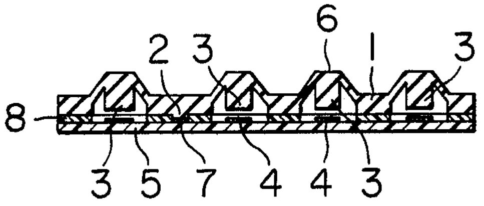
FIG. 2 is a cross sectional view of the conventional keyboard switch covering pad of FIG. 1 as mounted on a printed circuit board.

In FIG. 1 and FIG. 2 illustrating a perspective view and a cross section of a conventional keyboard switch covering pad as mounted on a printed circuit board, respectively, the covering sheet 1 is made of a sheet of an electrically conductive rubber such as a carbon-filled or metal powder-filled silicone rubber and it has a plurality of fixed contact points 2 and a plurality of switching contact points 3. The switching contact points 3 correspond to the individual switching functions required for the operation of the instrument such as the numerical figures and the mathematical operators and, when pushed downwardly, come into contact with the contact points 4 on the printed circuit board 5.

It is usual, though not limitative, that the upper surface of the covering sheet 1 is raised to form dome-like portions 6 on the area corresponding to each of the switching contact points 3 so that reliability in pushing is ensured. Optionally, the upper surface of the covering pad 1 can be flat. The fixed contact points 2 are in fixed contact with the common circuit terminals 7 so as that a common return is obtained when any one of the switching contact points 3 is pushed down.

Figure 3:
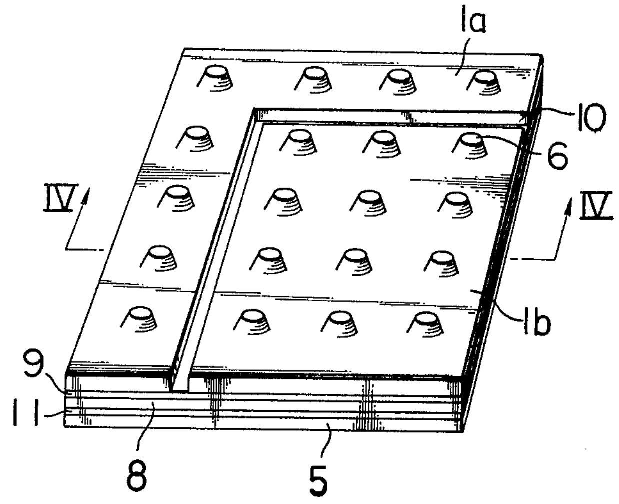
FIG. 3 is a perspective view of a keyboard switch covering pad according to the invention as mounted on a printed circuit board.

Turning now to the keyboard switch covering pad according to the invention illustrated in FIG. 3 showing a perspective view as mounted on a printed circuit board 5, the covering sheet is divided into two separate sections 1*a* and 1*b* and each of these sections 1*a* and 1*b* is adhesively bonded to an electrically insulating sheet 8 with the intervening layer 9 of an adhesive agent or a sticking agent to be a single integrated covering pad in such a manner that the sections 1*a* 1*b* are electrically insulated from each other, for example, by providing a space 10 therebetween.

It is of course that the covering sheet may be divided into as many as desired number of sections, if necessary, to ensure the independency of the individual key switches.

Figure 4:
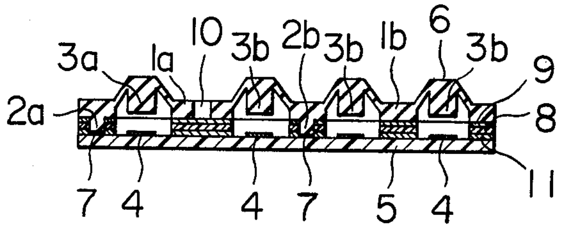
FIG. 4 is a cross sectional view of the keyboard switch covering pad of FIG. 3 as mounted on a printed circuit board.

As is shown in FIG. 4 illustrating a cross section of the keyboard switch covering pad in FIG. 3, each of the divided sections of the covering sheet 1*a* and 1*b* has at least one fixed contact point 2*a* or 2*b* and at least one switching contact points 3*a* or 3*b* and each of the sections 1*a* and 1*b* is adhesively bonded to an electrically insulating sheet 8 with an intervening layer 9 of the adhesive agent. The insulating sheet 8 is provided with openings in positions corresponding to the fixed contact points 2*a* and 2*b* and to the switching contact points 3*a* and 3*b* so as that these contact points penetrate the respective openings in the insulating sheet 8. It is a convenient way to provide a layer 11 of a sticking agent on the lower surface of the insulating sheet 8 in advance so as that the keyboard covering pad as a whole can be readily mounted and fixed on the printed circuit board 5.

The material for the divided covering sheets 1*a* and 1*b* is an electrically conductive rubber, e.g. silicone rubbers, impregnated with a conductivity-imparting powdery or fibrous filler such as carbon black, metal powder and chopped carbon fibers. It is desirable that the covering sheets 1*a* and 1*b* have an adequate elastic resilience so that they can rapidly resume their original forms after the force pushing down the switching contact point 3*a* is released.

On the other hand, the electrically insulating sheet 8 is made of any conventional insulating material such as thermoplastic resins, e.g. polyester resins, polyamide resins, polyimide resins, polyamideimide resins, polypropylene, polyethylene, polystyrene and polyvinyl chloride as well as various kinds of so-called FRP sheets of certain thermosetting resins, e.g. unsaturated polyester resins, diallylphthalate resins, epoxy resins and phenolic resins reinforced with paper, glass cloth, woven or non-woven fabrics of synthetic fibers and the like.

The thickness of the insulating sheet 8 can be very small when the only matter concerned is the electric insulation. However, it is desirable that the insulating sheet 8 has a stiffness to some extent so as to facilitate handling of the inventive keyboard switch covering pad as a whole. In this connection, the thickness of the insulating sheet 8 is usually in the range from 0.2 to 1.0 mm.

The adhesive agent or sticking agent used in the layers 9 and 11 for bonding the insulating sheet 8 to the covering sheets 1*a* and 1*b* and to the printed circuit board 5 is not limitative including polyether-based, polyacrylic acid-based, natural rubber-based and silicone-based ones. It is recommendable to use a silicone-based pressure-sensitive adhesive agent or sticking agent when the covering sheets 1*a* and 1*b* are made of an electroconductive silicone rubber.

The covering sheets 1*a* and 1*b* are each provided with at least one fixed contact point 2*a* or 2*b* and at least one switching contact point 3*a* or 3*b* on the same side. These contact points are shaped usually in a cylindrical form, though not limitative, and protrude through the respective openings in the insulating sheet 8. Accordingly, the fixed contact points 2*a* and 2*b* are always in direct contact with the contact terminals 7 on the printed circuit board 5 to form a common circuit when the pad is mounted on the printed circuit board 5 while the switching contact points 3*a* and 3*b* can be in contact with the contact points 4 on the printed circuit board 5 only when the keyboard covering pad is pushed downwardly at the domelike raised portions 6.

Figure 5:
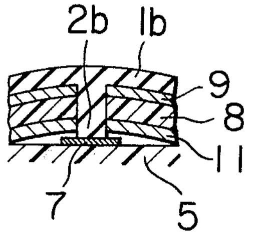
FIG. 5 and FIG. 6 are enlarged cross sectional view of the fixed contact point in the keyboard switch covering pad shown in FIG. 3 or FIG. 4.
Figure 6:
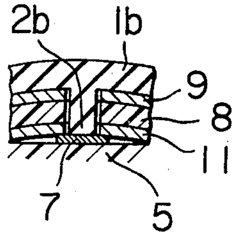

FIG. 5 and FIG. 6 illustrate the manner in which the fixed contact points 2*b* penetrates the insulating sheet 8 and the layers 9 and 11 of the adhesive agent or sticking agent. In FIG. 5, the lower end surface of the fixed contact point 2*b* is somewhat projected from the surface of the layer 11 of the sticking agent while, the lower end surface of the fixed contact point 2*b* may be in the same plane as the surface of the layer 11 of the sticking agent as is shown in FIG. 6.

The divided sections 1*a* and 1*b* of the covering sheet are each bonded to the insulating sheet 8 by use of an adhesive agent or a sticking agent to be a single integrated keyboard switch covering pad in such a manner that electric insulation is kept between them. In other words, the divided sections 1*a* and 1*b* are bonded to the insulating sheet 8 keeping a narrow space 10 therebetween so as that they are electrically isolated from each other excepting the contact at the fixed contact points 2*a* and 2*b* to form a common circuit. The width of the space 10 can be very small in so far as an insulating air gap is obtained.

Figure 7:
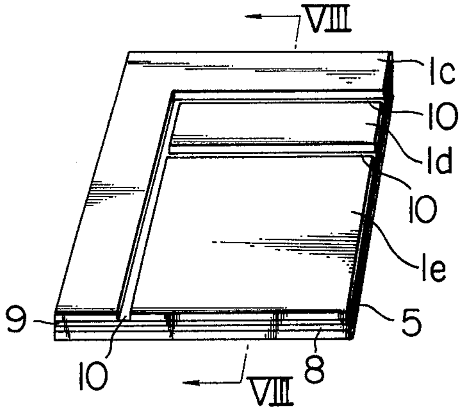
FIG. 7 is a perspective view of the inventive keyboard switch covering pad having flat upper surface and having a covering rubber sheet divided in three sections as mounted on a printed circuit board.
Figure 8:
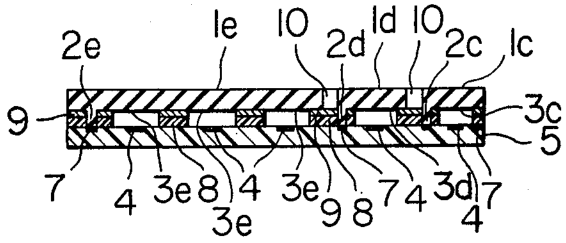
FIG. 8 is a cross sectional view of the keyboard switch covering pad of FIG. 7 as mounted on a printed circuit board.

As is described above, the covering sheet 1 may have a flat upper surface as is shown in FIG. 7 and FIG. 8 showing a perspective view and a cross sectional view, respectively, of such an embodiment in which the covering sheet 1 is divided into three sections 1*c*, 1*d* and 1*e*, each being isolated electrically from each other by the narrow space 10 therebetween as bonded to the common insulating sheet 8 with the intervening layer 9 of the adhesive agent. Each of the sections 1*c*, 1*d* and 1*e* has at least one fixed contact point 2*c*, 2*d* or 2*e* and at least one switching contact point 3*c*, 3*d* or 3*e*, the fixed contact points 2*c*, 2*d* and 2*e* being in fixed contact with the terminals 7 on the printed circuit board 5 and the switching contact points 3*c*, 3*d* and 3*e* facing the terminals 4 on the printed circuit board 5 with narrow air gaps 10 therebetween.

Figure 9:
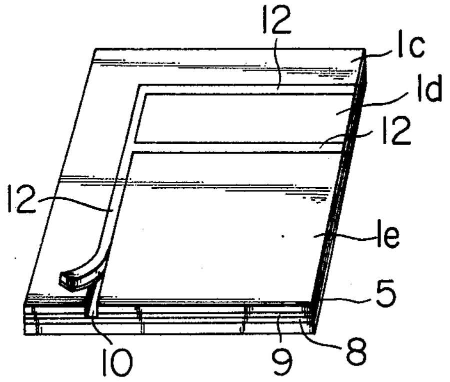
FIG. 9 is a perspective view illustrating the manner in which the keyboard switch covering pad of FIG. 7

The inventive keyboard switch covering pad illustrated in FIG. 3 or FIG. 7 can be prepared, of course, by bonding the individual sections 1*a* and 1*b* or 1*c*, 1*d* and 1*e* separately on to the insulating sheet 8 by use of an adhesive agent or a sticking agent. A convenient way for the preparation is, however, as follows. As is shown in FIG. 9 illustrating the preparation of the covering pad of FIG. 7, the covering sheet 1 is first shaped as a continuum with sharp notch lines cut along the contours of the space 10 leaving very thin film on one surface and, after it is bonded to the insulating sheet 8 through the layer 9 of an adhesive agent, the thin strap-like portion 12 is peeled off together with the corresponding portion of the layer 9 of the adhesive agent as shown by the arrow in FIG. 9 leaving the space 10 so that insulation between the sections 1*c*, 1*d* and 1*e* is obtained.

As is understood from the above description, the inventive keyboard switch covering pad is safe from inadvertent failure of the LSI or other electronic devices connected to the printed circuit board even when two or more of the key switches belonging to the different sections 1*a* and 1*b* or 1*e*, 1*d* and 1*e* of the covering sheet are pushed simultaneously without leading to the failure of the LSI and other devices or erroneous operation of them which is otherwise unavoidable in the conventional keyboard switch covering pads.

What is claimed is:

1. A keyboard switch covering pad mountable on a printed circuit forming a common circuit between the keyboard switch covering pad and the printed circuit which comprises (a) an electrically conductive rubber sheet having a plurality of fixed contact points and a plurality of switching contact points on one side thereof, said conductive rubber sheet being divided into at least two sections each having at least one fixed contact point and at least one switching contact point said conductive rubber sheet being completely free of openings, and (b) an electrically insulating sheet having a plurality of openings, on which the conductive rubber sheet as divided into sections is bonded in such a manner that each of the fixed contact points and the switching contact points penetrate one of the openings, the divided sections of the conductive rubber sheet are electrically insulated from each other and said electrically insulating sheet being provided with a layer of an adhesive on the surface thereof opposite to the electrically conductive rubber sheet for the mounting of same to said printed circuit.

2. The keyboard switch covering pad as claimed in claim 1 wherein the electric insulation between the divided sections of the electrically conductive rubber sheet is obtained by providing an air gap space therebetween.

* * * * *